United States Patent
Cau

[19]

[11] Patent Number: 5,833,416
[45] Date of Patent: Nov. 10, 1998

[54] FASTENING SYSTEM FEATURING DISCONNECTABLE COMPONENTS, PARTICULARLY FOR FASTENING OPTIONAL ACCESSORIES TO AUTOMOTIVE FINISH ELEMENTS

[75] Inventor: Pietro Cau, Turin, Italy

[73] Assignee: Lys Fusion S.p.A., Hone, Italy

[21] Appl. No.: 828,001

[22] Filed: Mar. 27, 1997

[30] Foreign Application Priority Data

Apr. 2, 1996 [IT] Italy .............................. TO96 A 000258

[51] Int. Cl.⁶ ................................ F16B 13/06; F16D 1/00
[52] U.S. Cl. ............................... 411/55; 411/554; 411/60; 403/407.1; 296/146.7
[58] Field of Search ..................................... 411/349, 549, 411/553–555, 55, 60; 403/405.1, 407.1; 296/146.7

[56] References Cited

U.S. PATENT DOCUMENTS

| | | | |
|---|---|---|---|
| 2,527,783 | 10/1950 | Zahodiakin | 411/554 |
| 4,063,335 | 12/1977 | Schenk | 411/554 |
| 4,585,366 | 4/1986 | Uchida | 403/405.1 |
| 4,883,382 | 11/1989 | Mushya | 403/405.1 |
| 5,269,640 | 12/1993 | Jonishi | 411/55 |
| 5,499,854 | 3/1996 | Crotty | 411/60 |

FOREIGN PATENT DOCUMENTS

| | | | |
|---|---|---|---|
| 1069366 | 11/1959 | Germany | 411/60 |
| 2236141 | 3/1991 | United Kingdom | 411/553 |

*Primary Examiner*—Flemming Saether
*Attorney, Agent, or Firm*—Schwartz & Weinrieb

[57] ABSTRACT

A fastening system including two components in the form of two independent fastening elements wherein a first fastening element is used to fasten a finish element such as a door panel, dashboard panel, or the like, to a vehicle body, and is first inserted through a hole in the finish element, and then fixed firmly to the vehicle body inside an opening formed in the body; and a second fastening element is used to fasten an accessory to the finish element, and is first fitted separately to the accessory, and then inserted inside the first fastening element and rotated slightly to establish a reversible connection; the first fastening element in the system is in the form of a one-piece plug made of high-mechanical-strength plastic, and the head of which has an inner cavity with two opposite symmetrical teeth projecting inwards of the cavity; the second fastening element includes an actuating body and a retaining element connected to each other beforehand through a hole formed in the accessory; and the retaining element has a cam, which cooperates beneath the teeth on the plug when the retaining element is inserted inside the cavity and rotated approximately a quarter turn, to connect the second fastening element to the first.

21 Claims, 1 Drawing Sheet

FASTENING SYSTEM FEATURING DISCONNECTABLE COMPONENTS, PARTICULARLY FOR FASTENING OPTIONAL ACCESSORIES TO AUTOMOTIVE FINISH ELEMENTS

FIELD OF THE INVENTION

The present invention relates to a fastening system, particularly for fastening optional accessories to automotive finish elements such as doors, dashboard finish panels, and the like, wherein at least part of the system is also used to fasten the finish elements to the vehicle body. The optional accessories which are to be fastened to the finish elements using the system according to the invention may be actual optional devices or components, such as ashtrays, paperholders, coin trays, and the like, which are only supplied to order with the vehicle or are assembled subsequently by the user, or may be functional elements, such as, for example, handles, armrests, and the like, which are located or configured differently according to the design version of the vehicle.

BACKGROUND OF THE INVENTION

At present, accessories are normally assembled using screws inserted through the panels and screwed directly inside holes formed in the body and concealed with special plugs, or are fitted to supports specially provided for such purpose inside the vehicle. Whichever the case, unless the location and type of accessory is provided for beforehand by the maker, holes must be formed and/or other work done on the finish panels or vehicle body in order to assemble the accessories.

The above known method of assembling accessories involves several obvious drawbacks. Firstly, the assembly invariably requires the use of tools, and often, the operating personnel are working in awkward positions. Secondly, the user may only want to select the most convenient position in which to assemble certain accessories by disregarding the assembly holes provided by the maker and necessarily forming other holes, which is a difficult job due to the number of operations involved, and in addition, such may also result in accidental damage to the finish element of the vehicle, or in unreliable assembly of the accessory. Thirdly, in the event any of the accessories are removed, the screw holes remain exposed, due to the plugs being practically impossible to obtain, thus impairing the look of the vehicle and forming a receptacle for dirt and dust.

Yet another drawback of known systems is the damage caused to the edge of the hole in the panel by the screw head when torquing the panel assembly screws, thus impairing the grip of the screw. Moreover, in time and with use of the accessory, the assembly screws, and hence the accessory itself, may eventually become loose.

OBJECT OF THE INVENTION

It is an object of the present invention to eliminate the aforementioned drawbacks by enabling accessories to be assembled easily, even without special tools, and by enabling accessories to be removed without damaging or in any way adversely affecting the former appearance of the panel to which they are fitted.

SUMMARY OF THE INVENTION

According to the present invention, there is provided a fastening system, particularly for fastening accessories to automotive inner finish panels, which comprises various features and structural components, as more explicitly disclosed and explained hereinafter, which permits the fastening of such accessories to automotive inner finish panels to be accomplished in a relatively simple manner, without the need for any special tools, and wherein the accessories can also be readily removed.

BRIEF DESCRIPTION OF THE DRAWINGS

A preferred, non-limiting embodiment of the present invention will be described by way of example with reference to the accompanying drawings, in which like reference characters designate like or corresponding parts throughout the several views, and wherein.

DETAILED DESCRIPTION OF THE INVENTION

Figure 1:
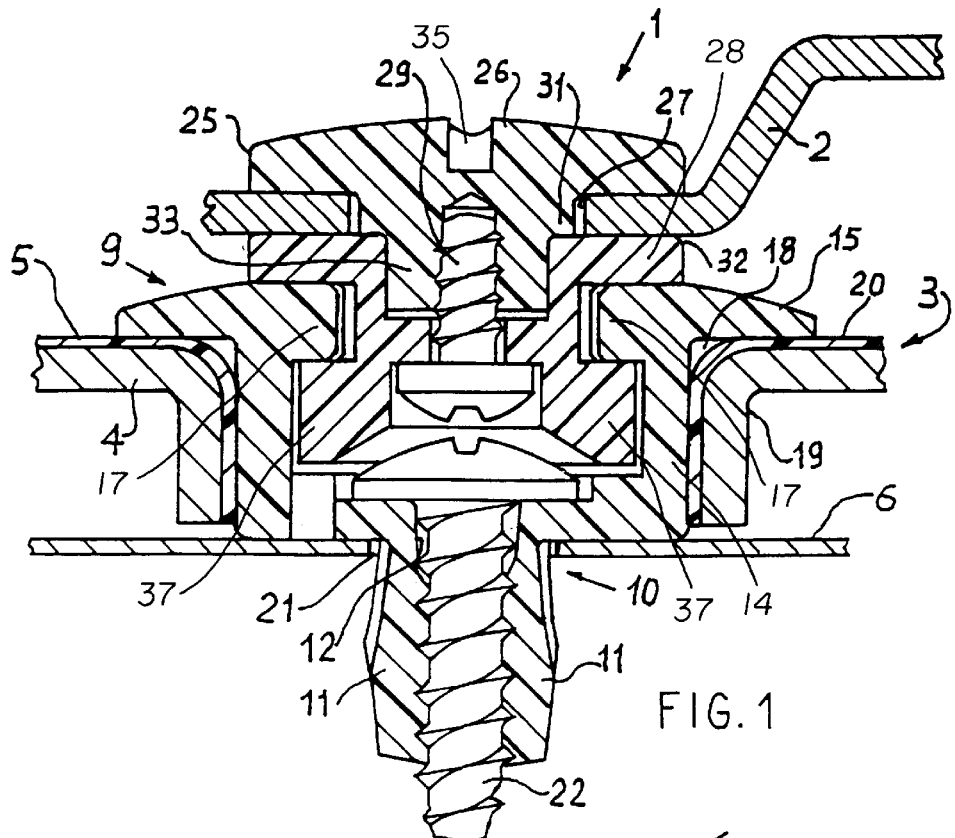
FIG. 1 is a cross-section of the fastening system according to the present invention.

Referring now to FIG. 1 indicates, the fastening system according to the present invention is generally indicated by the reference character 1 and is shown fully assembled so as to fasten an optional accessory 2—such as an ashtray, shown only partly for the sake of simplicity—to a vehicle finish element 3—such as a known foam inner panel of a dashboard, door, or the like—which is normally fitted to a frame such as a vehicle body 6.

Finish element 3 is normally in the form of a rigid sheet 4 of fibrous material impregnated and hardened with resins of various types, or of foam material, to which is applied a cloth, velvet, leather or artificial leather covering 5. It should be pointed out, however, that, according to the invention, finish element 3 may even be simply a sheet of cloth or other nonrigid material placed on the support comprising body 6 to simply cover the exposed metal.

Figure 2:
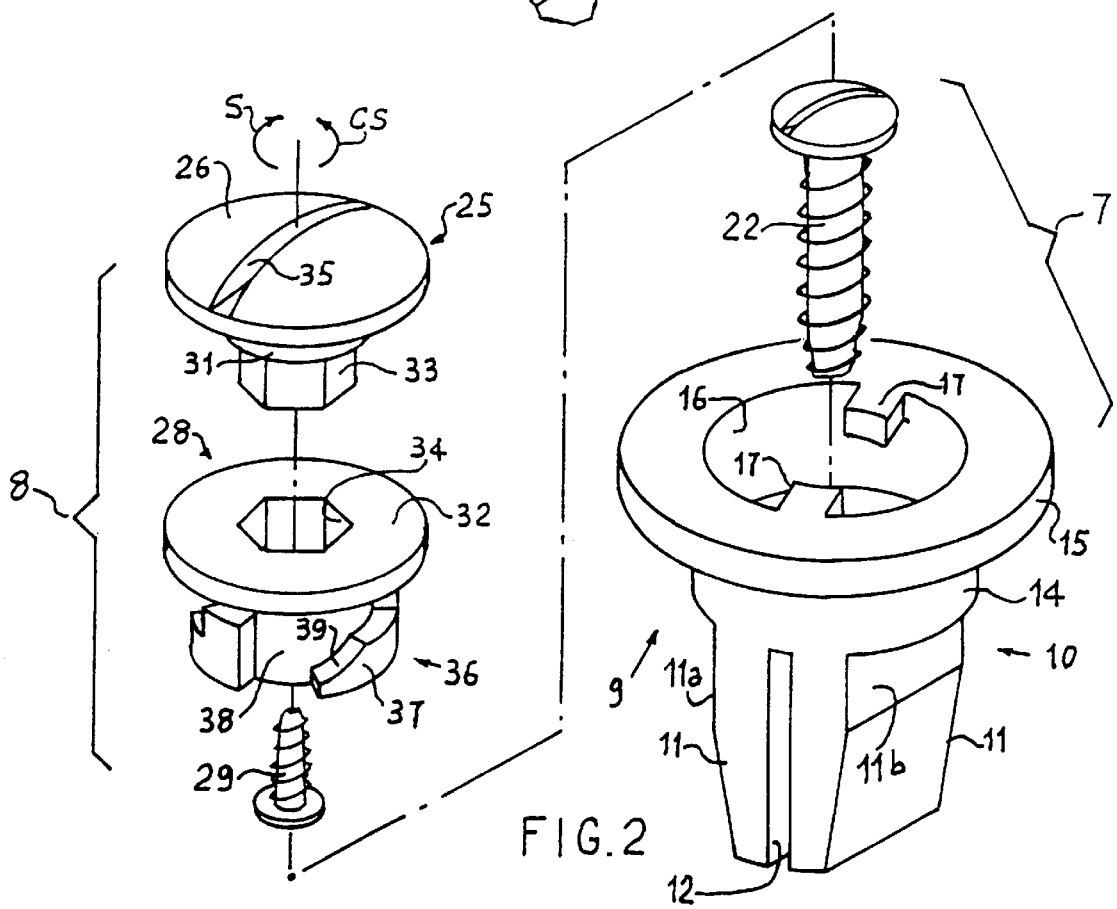
FIG. 2 is an exploded view of the fastening system shown in FIG. 1.

According to the invention, element 3 is fitted to supporting body 6 by means of one of the component elements of fastening system 1, which, in the example shown, comprises two completely independent fastening components or elements 7 and 8 as more particularly disclosed in FIG. 2: a first fastening element or subunit 7 for securing element 3 to body 6; and a second fastening element or subunit 8 for securing accessory 2 to element 3 by removably connecting element 8 to element 7.

As such, element 8 may first be fitted separately to accessory 2, and then, as will be seen, inserted inside and rotated slightly to removably connect it to element 7.

First element 7 of system 1 comprises a one-piece plug 9 made of high-mechanical-strength plastic, and in turn comprising a bottom appendix or screw nut 10 divided into two arms 11, as shown in FIG. 2, by means of a vertical longitudinal slot 12. Arms 11 of screw nut 10 comprise respective flat outer sides 11a and 11b parallel to each other and for preventing plug 9 from rotating inside the assembly seat, which, according to the invention, comprises an opening 21 in which screw nut 10 is inserted parallel to slot 12 and with a certain amount of transverse clearance to compensate for any minor inaccuracy in the mutual positions of body 6 and element 3. Screw nut 10 is formed in one piece with a head for clamping element 3, and which is defined by a cylindrical upper body 14 having a projecting circular collar 15 which mainly provides for increasing the supporting and tightening surface of plug 9 on element 3 so as to prevent element 3 from being damaged even when subjected to a strong tightening torque.

Upper body 14 also comprises an axial inner cavity 16 defined by a concentric hole extending through upper body 14 into slot 12; and, at the mouth of cavity 16, that is, on the side opposite screw nut 10, upper body 14 comprises two opposite, symmetrical retaining teeth 17 projecting radially inwards of cavity 16.

In actual use, one-piece plug 9 as described is first inserted with upper body 14 inside a hole 18 formed with a lip 19 in element 3, so that collar 15 rests on the outer surface 20 of element 3. Each element 3 may, of course, be fitted with several plugs 9, each inserted inside a hole 18 corresponding with an appropriate opening 21 formed through body 6; and, placing element 3 over body 6, each plug 9 in element 3 is then inserted at the screw nut 10 end inside the corresponding opening 21.

At this point, element 3 is secured to body 6 by inserting a self-tapping screw 22 of appropriate length through cavity 16 into screw nut 10 of each plug 9. Each screw 22 is then torqued inside respective slot 12 of screw nut 10, so as to grip the inner sides of arms 11 and flex arms 11 outwards, on the opposite side of body 6 with respect to element 3, so as to prevent subsequent withdrawal of screw nut 10 from opening 21 and secure element 3 and each plug 9 integrally with body 6, both axially and angularly, any rotation being prevented by the prismatic connection of sides 11a, 11b and opening 21.

According to the present invention, elements or panels 3 so fitted to body 6 may be left bare, that is, with no accessories, and with collars 15 of assembly plugs 9 therefore left exposed, or may be fitted, as will be seen, with accessories 2. In the first case, by virtue of the structure described, plugs 9 also act as buttons for concealing holes 18, and cavities 16 with teeth 17 do not noticeably affect the appearance otherwise obtainable, for example, using standard snap-on panel fasteners or cover buttons/plugs. To further improve appearance, however, plugs 9 may be made of plastic materials of different colors, and/or such as to mask cavities 16, and/or coordinated with the color of the panel covering.

The second fastening element 8, which is fitted beforehand to the accessory and may therefore be sold together with the accessory (or at any rate separately from element 7) if the accessory is not assembled originally by the vehicle maker, comprises two parts: a maneuvering body 25 with a wide head 26; and an inner retaining element 28 with connecting means for connecting second element 8 to first element 7.

Body 25 is fitted on one side of accessory 2 through a hole 27, shown in FIG. 1 formed, for example, through an assembly lip of accessory 2, so that head 26 is exposed and easily accessible outside accessory 2, or through the bottom wall of accessory 2, or at any rate in a position easily accessible from the outside. By means of a screw 29, body 25 is then connected to retaining element 28 on the opposite side of accessory 2, so as to grip accessory 2 between body 25 and element 28; for which purpose, body 25 and element 28 both comprise seats, one through and one blind, for screw 29.

Head 26 is formed in one piece with a coaxial appendix comprising a cylindrical portion and a prismatic portion; the cylindrical portion 31 is inserted inside hole 27; and the prismatic portion 33 is inserted inside a corresponding complementary prismatic cavity 34 formed in retaining element 28, so that rotation of body 25 is transmitted completely to retaining element 28 without acting on screw 29, which merely provides for axially connecting body 25 and element 28, which are thus removably connected to accessory 2.

The axial thickness of cylindrical portion 31 is such that the distance left between head 26 and a flat supporting surface 32 of retaining element 28 is greater than the thickness of accessory 2, and body 25, integral with retaining element 28, may thus rotate freely inside hole 27 of accessory 2. For such purpose, head 26 comprises a screwdriver slot 35 of such a size as to be operated using any flat body, such as, for example, a coin.

Retaining element 28 also comprises connecting means 36, in turn comprising a pair of opposite, symmetrical cam ribs 37, only one shown in FIG. 2, projecting externally from the lateral surface of a cylindrical portion 38, of element 28, smaller in diameter than the space left between the two projecting teeth 17 inside cavity 16.

Connecting means 36 thus cooperate with teeth 17 of plug 9 when cylindrical portion 38 of retaining element 28 is inserted inside cavity 16 of plug 9 and rotated approximately a quarter turn by body 25 in the direction of arrow S as shown in FIG. 2. When so doing, an inclined surface 39 of cam rib 37 engages beneath teeth 17 to force retaining element 28 axially inside cavity 16 and establish a stable, but reversible, and hence removable, connection of fastening elements 7 and 8.

Accessory 2 may therefore be fitted easily to element 3 by simply fitting accessory 2, as described, with the required number of elements 8; inserting each rotary element 8 inside any fixed element 7 already provided on the vehicle for assembling element 3; and then rotating head 26 of body 25 of each element 8 by approximately a quarter turn.

Similarly, a given accessory may be removed by simply rotating head 26 of body 25 in the opposite direction, as shown by arrow CS in FIG. 2, so as to release elements 7 and 8 from each other, and so release accessory 2 with no alteration in the appearance of element 3 as a whole.

Obviously, many modifications and variations of the present invention are possible in light of the above teachings. It is therefore to be understood that within the scope of the appended claims, the present invention may be practiced otherwise than as specifically described herein.

I claim:

1. A fastening system for fastening first, second, and third members together, comprising:

a first fastening element for fastening a first one of first, second, and third members to a second one of first, second, and third members;

a recess defined within said first fastening element; and a second fastening element having first means defined thereon for permitting said second fastening element to be fastened to a third one of the first, second, and third members, and second means defined thereon for insertion within said recess defined within said first fastening element so as to permit said second fastening element to be fastened to said first fastening element such that the first, second, and third members can be fastened together when said first and second fastening elements are fastened together as a result of said first means of said second fastening element being fastened to the third one of the first, second, and third members, and said second means of said second fastening element being fastened to said first fastening element as a result of being disposed within said recess defined within said first fastening element.

2. The fastening system as set forth in claim 1, wherein said first fastening element comprises:
   a dependent plug portion comprising a pair of resiliently expansible leg members for insertion within an aperture defined within the second one of the first, second, and third members;
   means insertable within said dependent plug portion and between said pair of resiliently expansible leg members for expanding said pair of resiliently expansible leg members outwardly away from each other so as to secure said dependent plug portion of said first fastening element within the aperture of the second one of said first, second, and third members; and
   annular collar means for engaging the first one of the first, second, and third members so as to secure the first one of the first, second, and third members upon the said second one of the first, second, and third members when said dependent plug portion of the first fastening element is secured within the aperture of the second one of the first, second, and third members.

3. The fastening system as set forth in claim 2, wherein:
   said pair of resiliently expansible leg members together define internally threaded nut means; and
   said means insertable between said pair of resiliently expansible leg members comprises a threaded screw.

4. The fastening system as set forth in claim 2, wherein said second fastening element comprises:
   a first flanged member having a first flanged portion for engaging a first surface portion of the third one of the first, second, and third members;
   a second flanged member having a second flanged portion for engaging a second surface portion of the third one of the first, second and third members such that the third one of the first, second, and third members can be secured; and
   means for securing said first and second flanged members together such that the third one of the first, second, and third members is secured between said first and second flanged portions of said first and second flanged members.

5. The fastening system as set forth in claim 4, wherein:
   said first fastening element comprises means for cooperating with said second means of said second fastening element so as to define a bayonet-type connection between said first and second fastening elements whereby said second fastening element, along with the third one of the first, second, and third members to be fastened to said second fastening element, can be removably connected to said first fastening element.

6. The fastening system as set forth in claim 5, wherein:
   said first fastening element recess is defined between said dependent plug portion and said annular collar means;
   said means of said first fastening element which comprises a first part of said bayonet-type connection comprises a pair of diametrically opposed projections extending radially inwardly upon said annular collar means;
   said second flanged member of said second fastening element comprises a body portion disposable within said recess of said first fastening element; and
   said second means of said second fastening element which comprises a second part of said bayonet-type connection comprises a pair of circumferentially extending, circumferentially spaced members disposed upon said body portion of said second flanged member of said second fastening element for engaging and disengaging said pair of diametrically opposed projections of said first fastening element so as to respectively make and break said bayonet-type connection between said first and second fastening elements depending upon the relative rotational disposition of said second fastening element with respect to said first fastening element.

7. The fastening system as set forth in claim 6, further comprising:
   means defined between said first and second flanged members of said second fastening element for transmitting rotary torque from said first flanged member to said second flanged member such that said circumferentially extending, circumferentially spaced members of said second flanged member can be disposed at predetermined angular positions with respect to said pair of diametrically opposed projections of said first fastening element so as to make and break said bayonet-type connection between said first and second fastening elements.

8. The fastening system as set forth in claim 7, wherein:
   said first and second flanged portions of said first and second flanged members are separated from each other by means of a predetermined distance which permits said first and second flanged members of said second fastening element to rotate relative to the third one of the first, second, and third members, secured between said first and second flanged portions of said first and second flanged members, when said first and second flanged members are rotated so as to make and break said bayonet-type connection with respect to said first fastening element.

9. The fastening system as set forth in claim 7, wherein said rotary torque transmitting means defined between said first and second flanged members of said second fastening element comprises:
   a cavity defined within said second flanged member and having an internal prismatic configuration; and
   projection means defined upon said first flanged member, and having an external prismatic configuration which is complementary to said internal prismatic configuration of said cavity of said second flanged member, for disposition within said cavity of said second flanged member.

10. The fastening system as set forth in claim 9, further comprising:
    slot means defined within a head portion of said first flanged member for receiving a tool by means of which rotary torque can be imparted to said first flanged member.

11. In combination, a fastening system for fastening first, second, and third members together, comprising:
    first, second, and third members to be fastened together;
    a first fastening element for fastening a first one of said first, second, and third members to a second one of said first, second, and third members;
    a recess defined within said first fastening element; and
    a second fastening element having first means defined thereon for permitting said second fastening element to be fastened to a third one of said first, second, and third members, and second means defined thereon for insertion within said recess defined within said first fastening element so as to permit said second fastening element to be fastened to said first fastening element such that said first, second, and third members can be fastened together when said first and second fastening elements are fastened together as a result of said first means of said second fastening element being fastened to said third one of said first, second, and third members, and said second means of said second fastening element being fastened to said first fastening element as a result of being disposed within said recess defined within said first fastening element.

12. The combination as set forth in claim 11, wherein:

said first one of said first, second, and third members comprises a vehicle finish element;

said second one of said first, second, and third members comprises a vehicle frame member; and said third one of said first, second, and third members comprises a vehicle accessory member.

13. The combination as set forth in claim 12, wherein said first fastening element comprises:

a dependent plug portion comprising a pair of resiliently expansible leg members for insertion within an aperture defined within said vehicle frame member;

means insertable within said dependent plug portion and between said pair of resiliently expansible leg members for expanding said pair of resiliently expansible leg members outwardly away from each other so as to secure said dependent plug portion of said first fastening element within said aperture of said vehicle frame member; and annular collar means for engaging said vehicle finish element so as to secure said vehicle finish element upon said vehicle frame member when said dependent plug portion of said first fastening element is secured within said aperture of said vehicle frame member.

14. The combination as set forth in claim 13, wherein:

said pair of resiliently expansible leg members together define internally threaded nut means; and said means insertable between said pair of resiliently expansible leg members comprises a threaded screw.

15. The combination as set forth in claim 13, wherein said second fastening element comprises:

a first flanged member having a first flanged portion for engaging a first surface portion of said vehicle accessory member;

a second flanged member having a second flanged portion for engaging a second surface portion of said vehicle accessory member such that said vehicle accessory member can be secured between said first and second flanged portions of said first and second flanged members; and means for securing said first and second flanged members together such that said vehicle accessory member is secured between said first and second flanged portions of said first and second flanged members.

16. The combination as set forth in claim 15, wherein:

said first fastening element comprises means for cooperating with said second means of said second fastening element so as to define a bayonet-type connection between said first and second fastening elements whereby said second fastening element, along with said vehicle accessory member fastened to said second fastening element, can be removably connected to said first fastening element.

17. The combination as set forth in claim 16, wherein:

said first fastening element recess is defined between said dependent plug portion and said annular collar means;

said means of said first fastening element which comprises a first part of said bayonet-type connection comprises a pair of diametrically opposed projections extending radially inwardly upon said annular collar means;

said second flanged member of said second fastening element comprises a body portion disposable within said recess of said first fastening element; and said second means of said second fastening element which comprises a second part of said bayonet-type connection comprises a pair of circumferentially extending, circumferentially spaced members disposed upon said body portion of said second flanged member of said second fastening element for engaging and disengaging said pair of diametrically opposed projections of said first fastening element so as to respectively make and break said bayonet-type connection between said first and second fastening elements depending upon the relative rotational disposition of said second fastening element with respect to said first fastening element.

18. The combination that was set forth in claim 17, further comprising:

means defined between said first and second flanged members of said second fastening element for transmitting rotary torque from said first flanged member to said second flanged member such that said circumferentially extending, circumferentially spaced members of said second flanged member can be disposed at predetermined angular positions with respect to said pair of diametrically opposed projections of said first fastening element so as to make and break said bayonet-type connection between said first and second fastening elements.

19. The combination as set forth in claim 18, wherein:

said vehicle accessory member has a predetermined thickness dimension; and said first and second flanged portions of said first and second flanged members are separated from each other by means of a predetermined distance which is slightly greater than said predetermined thickness dimension of said vehicle accessory member so as to permit said first and second flanged members of said second fastening element to rotate relative to said vehicle accessory member secured between said first and second flanged portions of said first and second flanged members when said first and second flanged members are rotated so as to make and break said bayonet-type connection with respect to said first fastening element.

20. The combination as set forth in claim 18, wherein said rotary torque transmitting means comprises:

a cavity defined within said second flanged member and having an internal prismatic configuration; and projection means defined upon said first flanged member, and having an external prismatic configuration which is complementary to said internal prismatic configuration of said cavity of said second flanged member, for disposition within said cavity of said second flanged member.

21. The combination as set forth in claim 20, further comprising:

slot means defined within a head portion of said first flanged member for receiving a tool by means of which rotary torque can be imparted to said first flanged member so as to rotate said first and second flanged members in order to make and break said bayonet-type connection.

* * * * *